United States Patent [19]

Wakui et al.

[11] Patent Number: 5,756,372

[45] Date of Patent: May 26, 1998

[54] METHOD OF MAKING LIQUID CRYSTAL DISPLAY

[75] Inventors: Yoko Wakui, Tokai-mura; Nobutake Konishi, Hitachioota, both of Japan

[73] Assignee: Hitachi, Ltd., Tokyo, Japan

[21] Appl. No.: 857,897

[22] Filed: May 16, 1997

Related U.S. Application Data

[62] Division of Ser. No. 450,127, May 25, 1995, Pat. No. 5,633,738.

[30] Foreign Application Priority Data

May 27, 1994 [JP] Japan ............................ 6-114935

[51] Int. Cl.$^6$ ............................................. H01L 21/00
[52] U.S. Cl. .......................... 438/30; 438/149; 438/154; 438/157; 438/158; 438/587; 438/981
[58] Field of Search ........................... 438/30, 149, 154, 438/157, 158, 587, 981, 109, 183, 184, 200, 201; 349/46; 359/58, 59; 257/59

[56] References Cited

U.S. PATENT DOCUMENTS

| | | | |
|---|---|---|---|
| 5,162,933 | 11/1992 | Kaduda et al. | 359/59 |
| 5,165,075 | 11/1992 | Hiroki et al. | 359/54 |
| 5,181,132 | 1/1993 | Shindo et al. | 359/58 |
| 5,242,543 | 9/1993 | Maejima et al. | 156/659 |
| 5,285,301 | 2/1994 | Shirahashi et al. | 359/59 |
| 5,327,268 | 7/1994 | Takabatake et al. | 359/59 |
| 5,464,500 | 11/1995 | Tsujimura et al. | 216/34 |
| 5,495,353 | 2/1996 | Yamazaki et al. | 359/59 |
| 5,633,738 | 5/1997 | Wakui et al. | 349/46 |

FOREIGN PATENT DOCUMENTS

| | | |
|---|---|---|
| 54-17573 | 6/1979 | Japan . |
| 0582505 | 2/1993 | Japan . |
| 06122982 | 5/1994 | Japan . |

*Primary Examiner*—John Niebling
*Assistant Examiner*—Long Pham
*Attorney, Agent, or Firm*—Antonelli, Terry, Stout, & Kraus,LLP

[57] ABSTRACT

A liquid crystal display comprises a lower substrate provided with a plurality of scanning signal lines, a plurality of image signal lines perpendicularly intersecting the scanning signal lines, a plurality of thin-film transistors formed at the intersection points of the scanning signal lines and the image signal lines, and a plurality of pixel electrodes connected respectively to the thin-film transistors; an upper substrate disposed opposite to the lower substrate and provided with a common electrode opposite to the pixel electrodes; and liquid crystal layer sealed in a space formed between the lower and the upper substrate. Each of the scanning signal lines is formed so as to form the gate electrode of a corresponding thin-film transistor, the scanning signal lines are formed by processing a metal film of columnar crystal grains, and the surface of the metal film is coated with a self-aligned oxide film.

3 Claims, 9 Drawing Sheets

METHOD OF MAKING LIQUID CRYSTAL DISPLAY

This application is a divisional application of application Ser. No. 08/450,127, filed May 25, 1995, now U.S. Pat. No. 5,633,738.

BACKGROUND OF THE INVENTION

The present invention relates to a liquid crystal display and, more particularly, to a thin-film transistor drive type liquid crystal display and a method of fabricating such a liquid crystal display.

A thin-film transistor drive type liquid crystal display (hereinafter referred to as "TFT liquid crystal display") employing thin-film transistors (TFTs) is one known type of liquid crystal display. This known TFT liquid crystal display is provided with TFTs formed on a transparent substrate to control the voltage to be applied to a liquid crystal at each pixel, is capable of displaying sharp images, and is used widely as a display for the terminal equipment of office automation equipment and liquid crystal TV sets.

Figure 11:
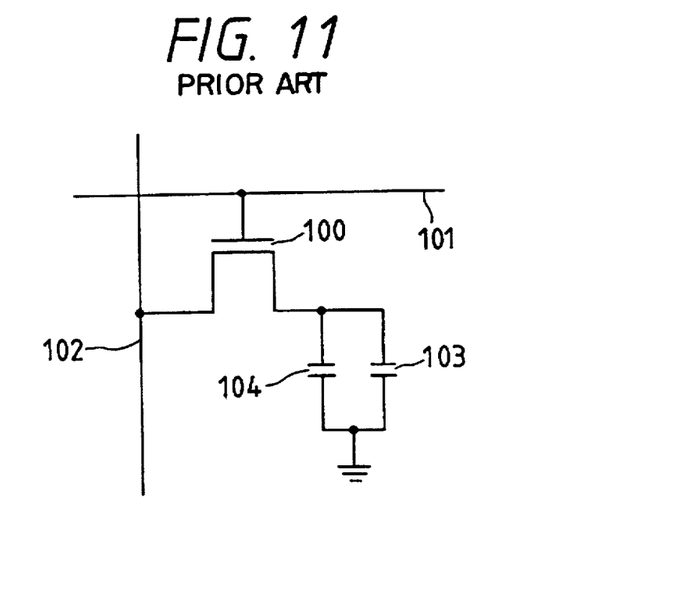
FIG. 11 is a circuit diagram of an equivalent circuit of one representing the pixels of a conventional liquid crystal display.

FIG. 11 is an equivalent circuit of one of the pixels of a conventional TFT liquid crystal display. A TFT 100 is located at the intersection point of a scanning signal line 101 and an image signal line 102 and is connected to a liquid crystal capacitor 103 and a storage capacitor 104. When the TFT 100 is turned on by a signal transmitted through the scanning signal line 101, the potential of the image signal line 102 is written on a pixel electrode, and the liquid crystal capacitor 103 and the storage capacitor 104 are charged. When the TFT is turned off, the liquid crystal capacitor 103 and the storage capacitor 104 hold the charge. However, the resistances of the scanning signal line 101 and the image signal line 102 affect picture quality. Thus, if the resistances of the scanning signal line 101 and the image signal line 102 are large, signals are delayed and arrive at corresponding pixels at different times, and hence sharp images are not displayed. Therefore, it is desirable to form the signal lines of a wiring material having the lowest possible resistivity. An oxide film can be formed on lines of such a wiring material by a well-known anodic oxidation process or the like, and the oxide film can be used as an insulating film for insulating the scanning signal line 101 and the image signal line 102 and as a gate insulating film for the TFT 100. Aluminum is such a preferable wiring material. Wiring lines are formed by forming a film by a vacuum evaporation process, a vacuum sputtering process or the like, patterning a photoresist film formed over the film by a known photolithographic process to form a photoresist mask, and patterning the film by a wet etching process using an etchant or a dry etching process using a chloric gas.

Sometimes, the shape of the self-aligned insulating film formed on the aluminum lines affects the conductive line yield or picture quality adversely. For example, if the shape of the wall of the section of the scanning signal line 101 or the image signal line 102 is an overhanging shape or a nearly vertical shape, the former reduces the conductive line yield of the image signal line 102 and the latter deteriorates the flatness of the protective film, thereby spoiling the orientation of the liquid crystal and deteriorating the picture quality. Moreover, electrostatic focusing due to the edge effect of the gate electrode is liable to cause a dielectric breakdown of the gate insulating film, which deteriorates the characteristics of the TFT. The same problem arises in the gate electrode of the TFT connected to the scanning signal line, the drain electrode connected to the image signal line and the source electrode.

A method proposed to solve such a problem, as disclosed in Japanese Patent Laid-open No. 5-82505, etches an aluminum film with a hydrofluoric acid etchant or a nitric acid etchant to form aluminum wiring lines having a tapered cross section. However, this method damages the glass substrate and the insulating film, and the taper of the cross section of the aluminum wiring lines is excessively small and the aluminum wiring lines have a comparatively large resistance.

SUMMARY OF THE INVENTION

Accordingly, it is an object of the present invention to provide a liquid crystal display having signal lines formed with an improved conductive line yield and a protective film of improved flatness, and to provide a method of fabricating such a liquid crystal display.

According to one aspect of the present invention, a liquid crystal display comprises a lower substrate provided with a plurality of parallel scanning signal lines, a plurality of parallel image signal lines perpendicularly intersecting the scanning signal lines, a plurality of TFTs formed at the intersection points of the scanning signal lines and the image signal lines, and a plurality of pixel electrodes connected to the plurality of TFTs, respectively; an upper substrate disposed opposite to the lower substrate and provided with a common electrode formed opposite to the pixel electrodes; and a liquid crystal layer sandwiched between the lower substrate and the upper substrate; the plurality of scanning signal lines serving as the gate electrodes of the corresponding TFTs, respectively, the scanning signal lines being metal films of columnar grains, and self-aligned oxide films being formed on the metal films.

When forming conductive metal lines having an upward tapered cross section, a conventional method utilizes the adhesion between a photoresist film and a metal film, and another conventional method forms an intermediate layer between a photoresist film and a metal film. The present invention forms conductive metal lines having an upward tapered cross section and inclined side surfaces inclined at an inclination of 45° or below by utilizing the crystalline properties of the metal. The inventors of the present invention found, through the examination of various taper etching processes for etching a metal film, that the tapered shape of the cross section of conductive metal lines is dependent on the crystal grains of the material and have made the present invention on the basis of this finding.

Accordingly, it is a feature of the present invention to process a metal film to form conductive metal lines having an upward tapered cross section utilizing the crystalline properties of the metal forming the metal film. The conductive metal lines having a tapered cross section and side surfaces inclined at an inclination of 45° or below and insulating films covering the conductive metal lines and having a tapered cross section and side surfaces inclined at an inclination of 45° or below suppress the edge effect.

A metal material having columnar crystal grains can be obtained by adding at least one of the transition elements of groups IVa and Va to aluminum (Al) as a matrix.

An insulating film having an upward tapered cross section and side surfaces inclined at an inclination of 45° or below can be formed by controlling the nitric acid concentration and the acetic acid concentration of a mixed etchant for etching Al films prepared by mixing phosphoric acid, nitric acid and acetic acid.

The present invention is not limited in its application to a method of forming gate electrodes and gate insulator films, and further the present invention is effectively applicable to a method of forming scanning signal lines, image signal lines, drain electrodes extending from image signal lines, and source electrodes.

The present invention is applied to processing metal films formed by a sputtering process, an electron beam source evaporation process or the like. The crystal structures of those films are different from those of bulk metals. In general, the following crystal structures are formed under conditions expressed by the following inequalities.

Equiaxed crystal grain Tm>T>Tr (1)

Columnar crystal grain: Tr>T>Tsd (2)

Fibrous and porous crystal grain: Tsd>T (3)

where T is the temperature of the substrate, Tm is the melting point of the metal, Tr is the recrystallization temperature of the metal and Tsd is the surface self-diffusion temperature of the metal.

It was confirmed through experiments, in which processes were controlled under the above-mentioned conditions, that columnar crystal grains are most suitable for forming conductive lines having an upward tapered cross; section, that columnar crystal grains can be formed by controlling the temperature of the substrate during the deposition of a metal film and that the addition of at least one of the transition elements of the groups IVa and Va to the matrix facilitates forming columnar crystal grains.

Figure 2:
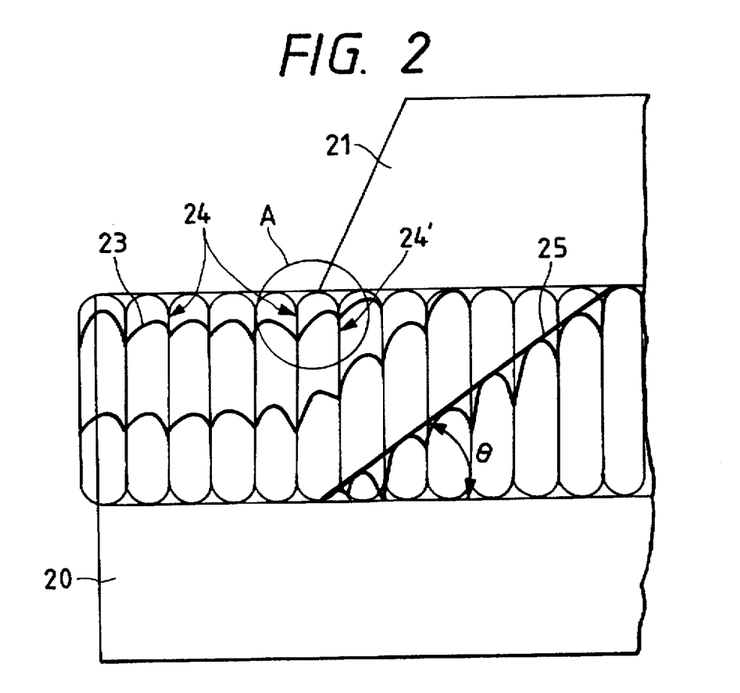
FIG. 2 is a diagrammatic sectional view showing a mode of progress of etching of a metal wiring line of columnar crystal grains.
Figure 3:
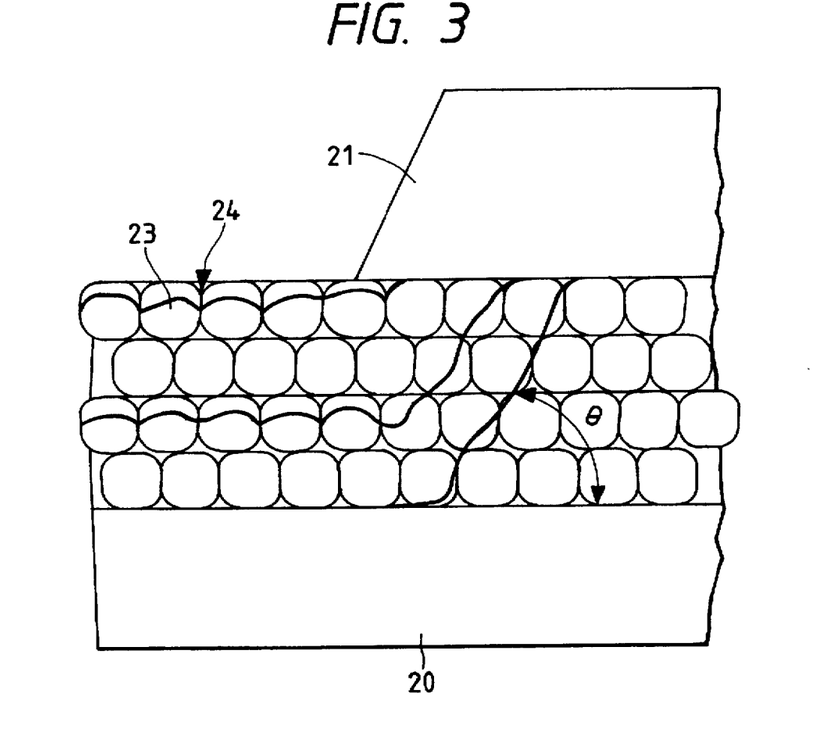
FIG. 3 is a diagrammatic sectional view showing a mode of progress of etching of a metal wiring line of equiaxed crystal grains.

A metal film of columnar crystal grains forms, when etched, conductive lines having an upward tapered cross section in the following way. FIG. 2 depicts typically the progress of etching a metal film of columnar crystal grains formed under conditions meeting inequality (1), and FIG. 3 depicts the progress of etching a metal film of equiaxed crystal grains formed under conditions meeting inequality (2). Basically, etching proceeds along grain boundaries and then progresses into crystal grains as shown in FIGS. 2 and 3, in which thick lines indicate processions of etching at different times. When etching the metal film of columnar crystal grains shown in FIG. 2, etching progresses along grain boundaries 24 at the initial stage of etching, and then etching progresses into crystal grains 23. It is known from close observation of the boundary A between the metal film and a resist film 21 that etching progresses only along a grain boundary 24 on one side of the crystal grain at the initial stage of etching, and etching progresses along a grain boundary 24' on the other side of the crystal grain after etching has progressed into the crystal grain. This process progresses continuously as indicated by thick lines and, finally, the metal film is etched in an upward tapered.shape as indicated by a thick line 25. In the metal film of equiaxed crystal grains shown in FIG. 3, grain boundaries extend longitudinally (depthwise) and transversely (along the surface). Therefore, the mode of progress of etching of the metal film of equiaxed crystal grains is different from that of etching of the metal film of columnar crystal grains. Accordingly, it is difficult to control the shape of an etched surface and the metal film of equiaxed crystal grains cannot be etched in an upward tapered shape as shown.

When the metal film is etched in conductive lines having an upward tapered cross section having inclined side surfaces inclined at an inclination θ of 45° or below, an insulating film can be stably formed over the conductive lines by an-anodic oxidation process. Since an anodic forming process is carried out in a high electric field, the insulating film is broken by electrostatic focusing on the edges of the conductive lines. Therefore, the inclination θ of 45° or below is desirable to suppress electrostatic focusing.

Figure 4:
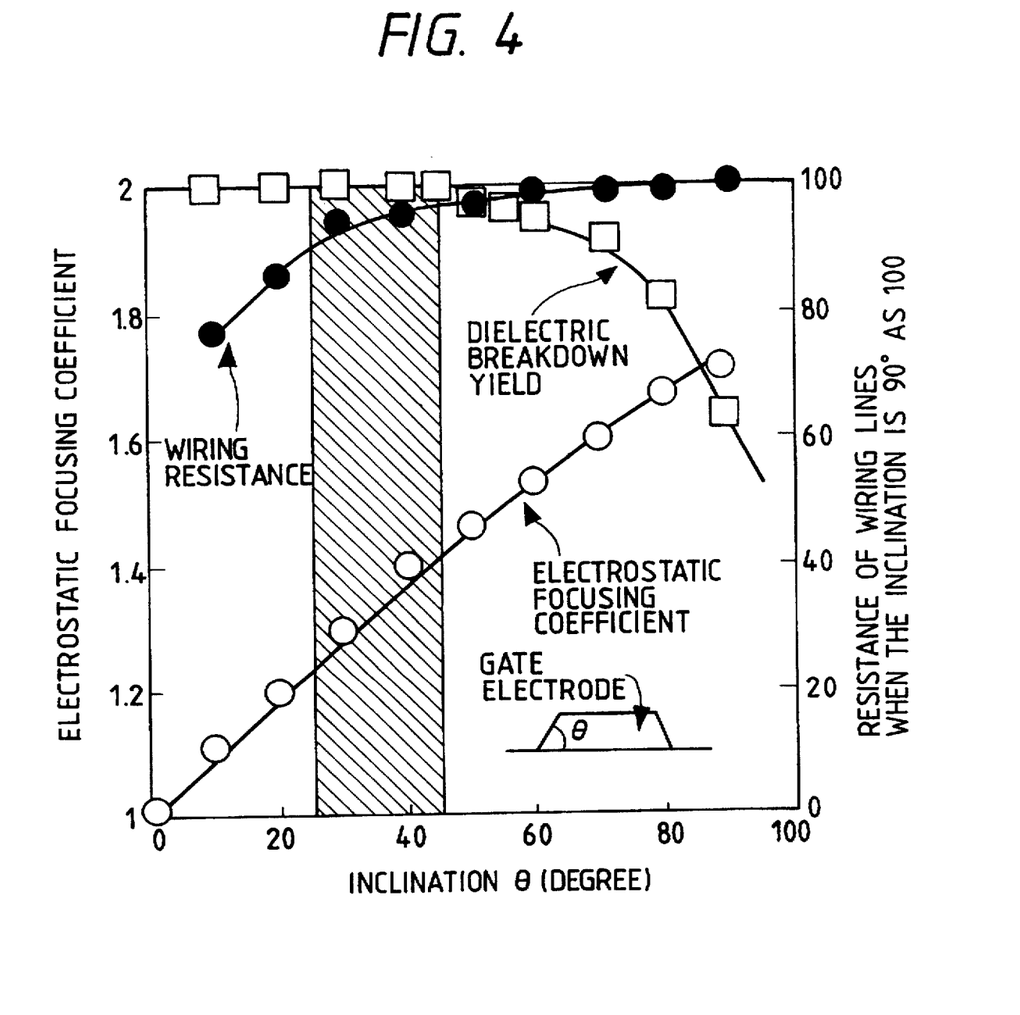
FIG. 4 is a graph showing the variations of electrostatic focusing coefficient, dielectric breakdown yield and the resistance of wiring lines with side surface inclination.

FIG. 4 is a graph showing both the relation between the electrostatic focusing coefficient and the side surface inclination θ, and the variation of the breakdown yield of insulating films with variation of the side surface inclination θ. As is evident from FIG. 4, side surface inclinations of 45° or below tend to effectively suppress the reduction of dielectric breakdown yield of anodic oxidation coatings due to electrostatic focusing. The resistance of a wiring line is dependent on its sectional area and increases when the side surface inclination is reduced. FIG. 4 shows the variation of the resistance of an aluminum wiring line of 10 µm in width and 400 nm in thickness with the side surface inclination θ of the aluminum wiring line. The resistance decreases sharply when the side surface inclination θ decreases below about 20°. In view of both the suppression of the dielectric breakdown of the insulating film and the reduction of the resistance of the same, a desirable side surface inclination θ is in the range of 20° to 45°.

BRIEF DESCRIPTION OF THE DRAWINGS

These and other objects, features and advantages of the present invention will be understood more clearly from the following detailed description with reference to the accompanying drawings, wherein.

DESCRIPTION OF THE PREFERRED EMBODIMENTS

Figure 1:
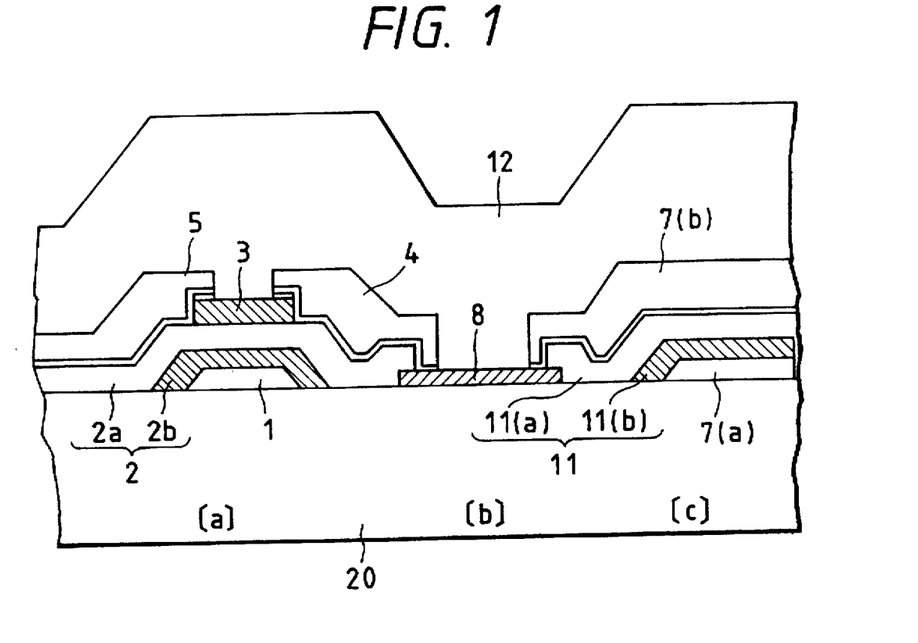
FIG. 1 is a sectional view of one of a typical one of the pixels of a TFT liquid crystal display in a preferred embodiment according to the present invention.

First the constitution of a TFT liquid crystal display in accordance with the present invention will be described with reference to FIG. 1 showing a typical one of the pixels of the TFT liquid crystal display in a sectional view.

A TFT section a, a pixel electrode section b, an additional capacitor section c, a scanning signal line and an image signal line are formed on a transparent glass substrate 20. The TFT section a comprises a gate electrode 1, a gate insulating film 2b formed over the gate electrode 1, a second insulating film 2a, an i-type Si layer 3, a source electrode 4 and a drain electrode 5. The gate electrode 1 is extended so as to merge into the scanning signal line 101 (FIG. 11), and the drain electrode 5 is extended so as to merge into the image signal line 102 (FIG. 11). The pixel electrode section b has a transparent pixel electrode 8. The additional capacitor section c comprises a capacitor electrode 7(a) of the same constitution as the gate electrode 1 and formed simultaneously with the gate electrode 1, another capacitor electrode 7(b) of the same constitution as the source electrode 4 and the drain electrode 5 and formed simultaneously with the source electrode 4 and the drain electrode 5, a capacitor insulating film 11(a) of the same material as that of the second gate insulting film 2a and formed simultaneously with the second gate insulating film 2a, and a capacitor insulating film 11(b) of the same material as that of the insulating film 2b and formed simultaneously with the insulating film 2b. The transparent pixel electrode 8 of the pixel electrode section b is connected through the gate insulating films 2a and 2b to the source electrode 4 of the TFT section a, and through the capacitor insulating film 11(a) and 11(b) to the capacitor electrode 7(b) of the additional capacitor section c.

This embodiment is featured by the gate electrode 1 of the TFT section a, the capacitor electrode 7(a) of the additional capacitor section c, the gate insulating film 2b formed over the gate electrode 1, and the capacitor insulating film 11(b) respectively having upward tapered cross sections.

Figure 5A:
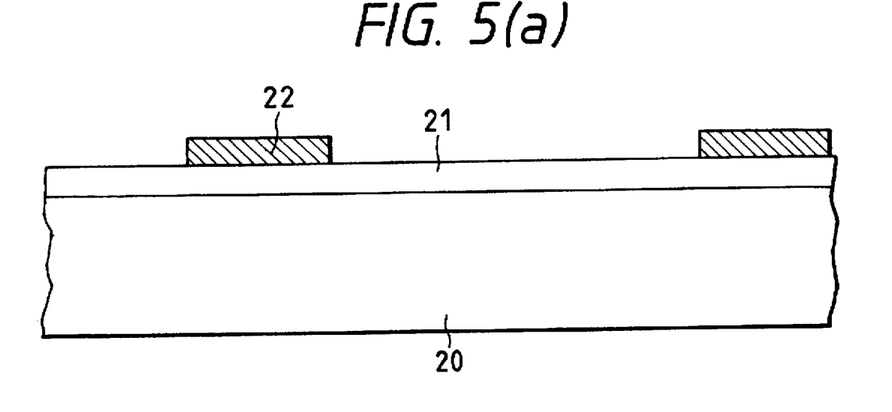
FIGS. 5(a), 5(b) and 5(c) are sectional views of a typical workpiece at different stages of a process of fabricating a TFT liquid crystal display embodying the present invention.

Metal lines having upward tapered cross sections can be formed by controlling the process of depositing crystal grains of the metal materials and the use of appropriate etchants, which will be described in connection with a TFT liquid crystal display fabricating method in a preferred embodiment of the present invention with reference to FIGS. 5(a) to 5(c), 6(a) to 6(c) and 7. Referring to FIG. 5(a), an aluminum film 21 is formed in a thickness in the range of 300 to 400 nm over the surface of a transparent glass substrate 20 by sputtering under conditions meeting inequality (2), Tr>T>Tsd. Since the recrystallization temperature Tr of aluminum is about 423K and the surface self-diffusion temperature Tsd of aluminum is about ¹⁄₁₀ of the melting point Tm of the same, the glass substrate 20 is heated at a temperature in the range of 373 to 413K when forming the aluminum film 21 by sputtering. A photoresist mask 22 of a desired pattern is formed by patterning a photoresist film formed over the aluminum film 21 by an ordinary photolithographic process.

Figure 5B:
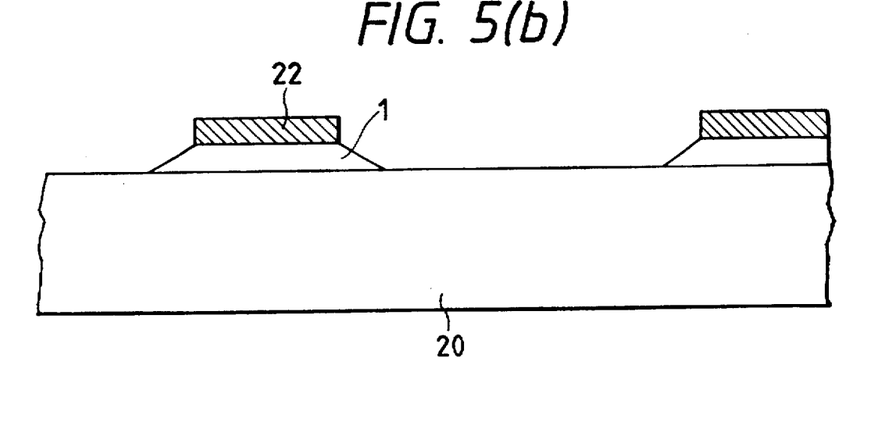

Then, as shown in FIG. 5(b), the workpiece is immersed in an etchant for etching the aluminum film 21 to form a gate electrode 1 of a cross section having inclined side surfaces inclined at an inclination θ of 45° or below. The etchant is prepared by mixing phosphoric acid, nitric acid, and acetic acid as a diluent.

Figure 8:
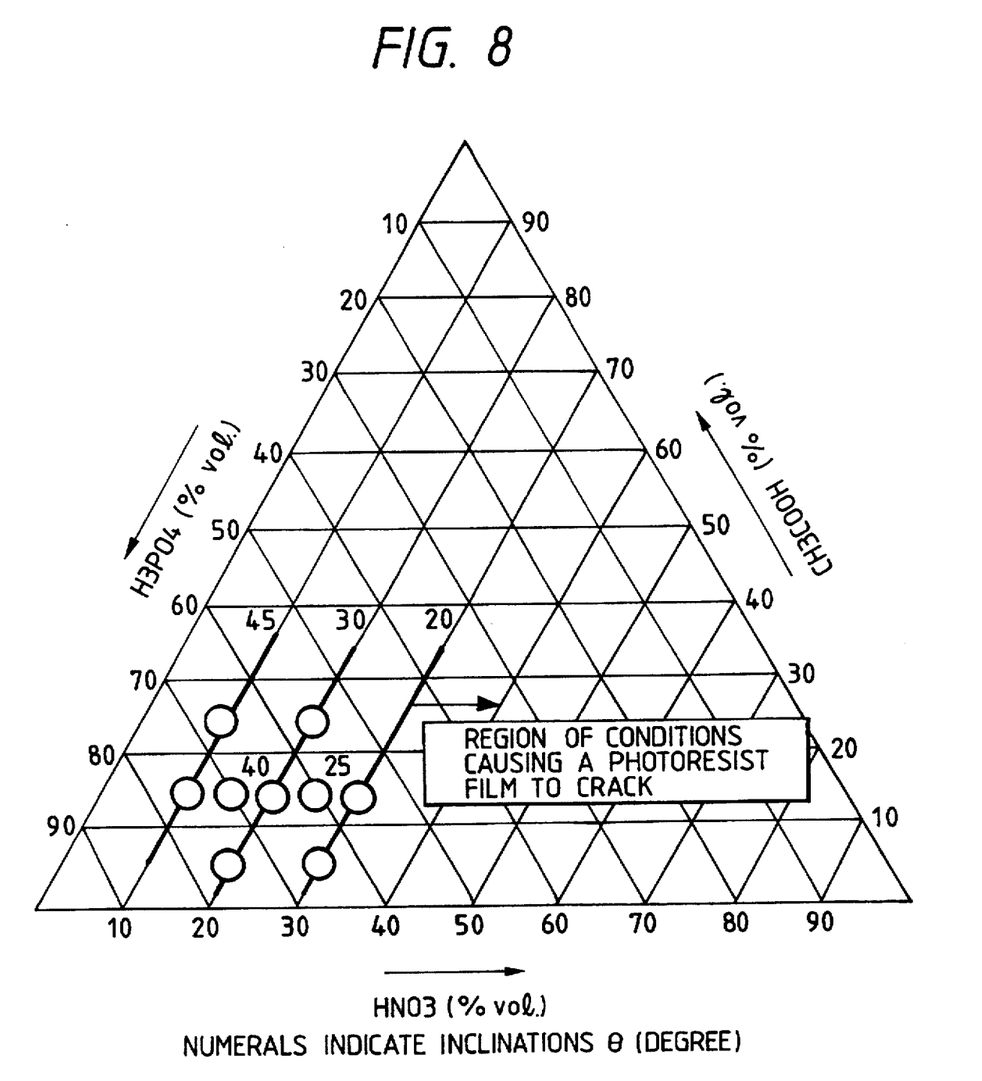
FIG. 8 is a triangular diagram showing the composition of etchants employed in the present invention.

FIG. 8 is a triangular diagram showing the dependence of the inclination θ on the composition of the etchant, in which numerals 25, 30, 40 and 45 are the inclinations of the side surfaces of gate electrodes formed by etching using etchants of different compositions, respectively. As mentioned in connection with FIG. 4, a desirable inclination θ is 45° or below. From FIG. 8, the nitric acid concentration of the etchant capable of etching the aluminum film 21 to form the gate electrode 1 in a cross section having side surfaces inclined at an inclination of 45° is 10% vol. or above. However, a nitric acid concentration exceeding 30% vol. cracks the photoresist mask. A desirable acetic acid concentration is 50% vol. or above. When etchants of compositions in phosphoric acid: nitric acid: and acetic acid of 75:10:15, 70:15:15, 65:20:15 and 75:25:15 are used, the inclinations are 45°, 40°, 30° and 25°, respectively. The nitric acid concentration dominates the inclination θ, which is inferred to be due to the alteration of the mechanical properties of the photoresist by nitric acid and the dependence of the inclination θ on the mechanical properties of the photoresist. When the nitric acid concentration is 30% vol. or below in view of the deterioration of the photoresist, the aluminum film of columnar crystal grains can be etched to form the gate electrode 1 of an upward tapered cross section having side surfaces inclined at a desired inclination.

Figure 5C:
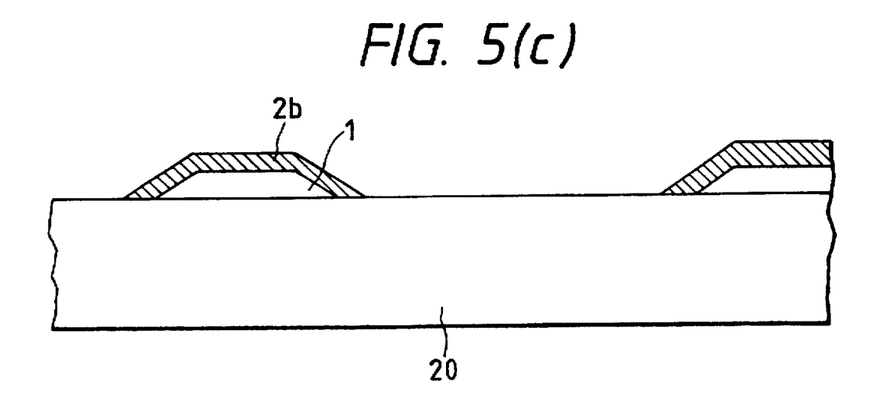

Then, as shown in FIG. 5(c), a gate insulating film 2b of aluminum oxide is formed over the gate electrode 1 by an anodic oxidation process. The anodic oxidation process may be of an ordinary system that anodizes a metal in an electrolytic solution. Practically, the aluminum oxide film was formed by a constant-current-constant-voltage electrolysis, in which a platinum plate as a cathode was disposed opposite to the gate electrode 1, the surface of which is to be anodized to form an aluminum oxide film, the platinum plate and the gate electrode 1 were immersed in a 3% tartaric acid solution as an electrolytic solution, and a formation voltage in the range of 100 to 200 V was applied across the platinum plate and the gate electrode 1 so that the current density was 3 mA/m². The thickness of the aluminum oxide film was in the range of 150 to 200 nm. The inclination of the aluminum gate electrode 1 was not changed by the anodic oxidation process.

Figure 6A:
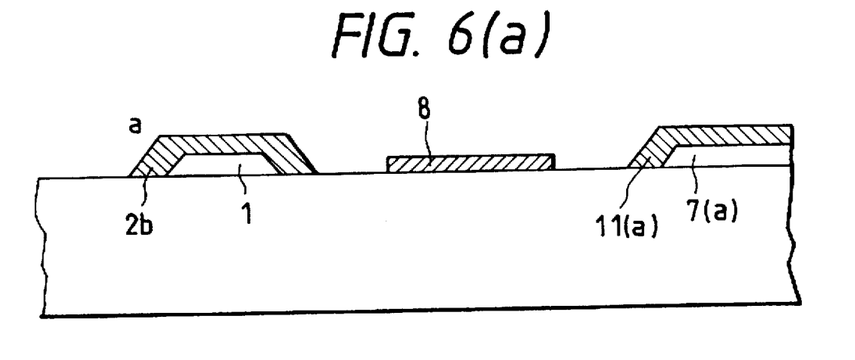
FIGS. 6(a), 6(b) and 6(c) are sectional views of the workpiece at difference stages of the process of fabricating the TFT liquid crystal display in accordance with the present invention.

Then, as shown in FIG. 6(a), a transparent pixel electrode 8 of a thickness in the range of 120 to 200 nm is formed by a sputtering process. The transparent pixel electrode 8 is a transparent conductive film of ITO (indium tin oxide), i.e., a NESA film.

Figure 6B:
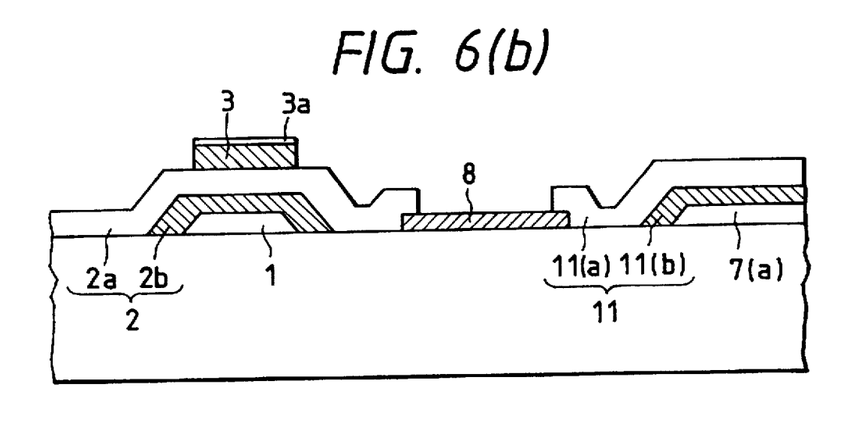

Then, as shown in FIG. 6(b), an i-type Si layer 3, an amorphous Si layer or a polycrystalline Si layer, of a thickness of about 180 nm, is formed by depositing amorphous Si. The i-type Si layer 3 is formed subsequently to the formation of a SiN gate insulating film 2a and a capacitor insulating film 11(b), in the same film forming chamber of a plasma CVD apparatus as that in which the SiN gate insulating film 2a and the capacitor insulating film 11(b) have been formed without taking out the workpiece from the film forming chamber. Similarly, an n⁺-type semiconductor layer 3a doped with phosphorus of about 40 nm in thickness for ohmic contact is formed. Then, the workpiece is taken out from the plasma CVD apparatus and is subjected to a photolithographic process to pattern the i-type Si layer 3 in the shape of a land on the gate electrode 1. Then, portions of the SiN gate insulating film 2a corresponding to the transparent pixel electrode 8 and terminals, not shown, are removed by a known dry etching process so that the surface of the transparent pixel electrode 8 is exposed.

Figure 6C:
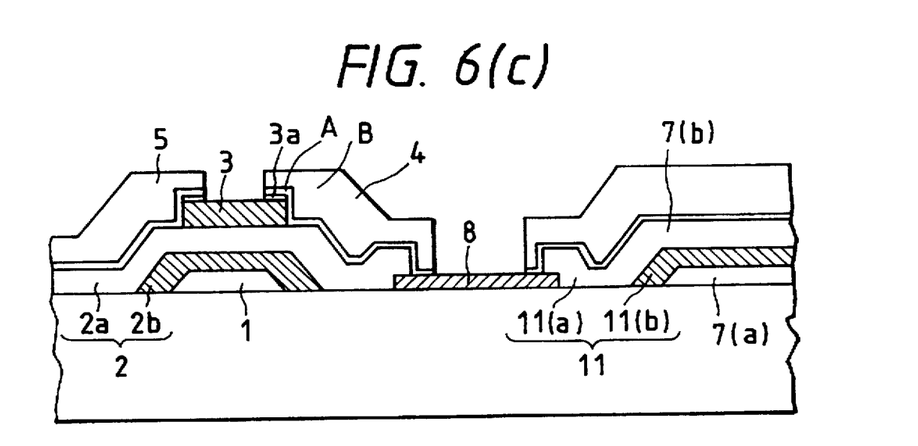

Then, as shown in FIG. 6(c), a source electrode 4 and a drain electrode 5 are formed. Each of the source electrode 4 and the drain electrode 5 has a laminated structure consisting of a first conductive film A formed in contact with the n⁺-type semiconductor layer 3a, and a second conductive film B formed over the first conductive film A. The respective first and second conductive films A of the source electrode 4 and the drain electrode 5 are formed simultaneously by the same process. In this embodiment, the first conductive films A are chromium films of a thickness in the range of 50 to 100 nm formed by sputtering. A chromium film satisfactorily adheres to the n$^+$-type semiconductor layer 3a. The first conductive film A serves as a barrier layer that prevents the diffusion of the second conductive film B into the n$^+$-type semiconductor layer 3a. The first conductive film A may be formed of a metal having a high melting point, such as Mo, Ti, Ta or W, or a metal silicide having a high melting point, such as MoSi$_2$, TiSi$_2$, TaSi$_2$ or WSi$_2$ instead of chromium. The second conductive film B is an aluminum film of a thickness in the range of 300 to 400 nm formed by sputtering. The second conductive film B may be a Si-containing aluminum film or a Cu-containing aluminum film.

The source electrode 4 and the drain electrode 5 are formed by patterning the first conductive film A and the second conductive film B by a photolithographic process as shown in FIG. 6(c). The n$^+$-type semiconductor layer 3a is masked with the first conductive film A, the second conductive film B and a photoresist mask so that the unmasked part of the n$^+$-type semiconductor layer 3a is removed; that is, a portion of the n$^+$-type semiconductor layer 3a not underlying the first conductive film A and the second conductive film B is self-alignedly removed by its thickness. Although the drain electrode 4, the source electrode 5 and the image signal line are formed over the gate electrode 1 and the gate insulating film 2b so as to extend across the latter, defects, such as breakages, at the intersection points are reduced because the gate electrode 1 and the gate insulating film 2b have upward tapered cross sections, respectively.

Figure 7:
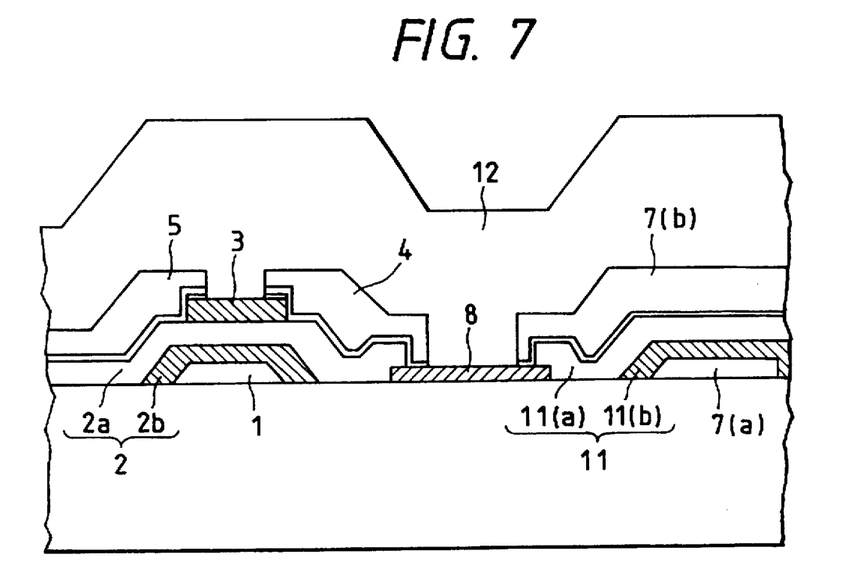
FIG. 7 is a sectional view of a typical one of the pixels of a TFT liquid crystal display in accordance with the present invention.

Then, as shown in FIG. 7, a 1 μm thick protective film 12 of SiN is formed by a plasma CVD process over the entire surface of the pixel, excluding regions corresponding to the terminals and the like.

Figure 9:
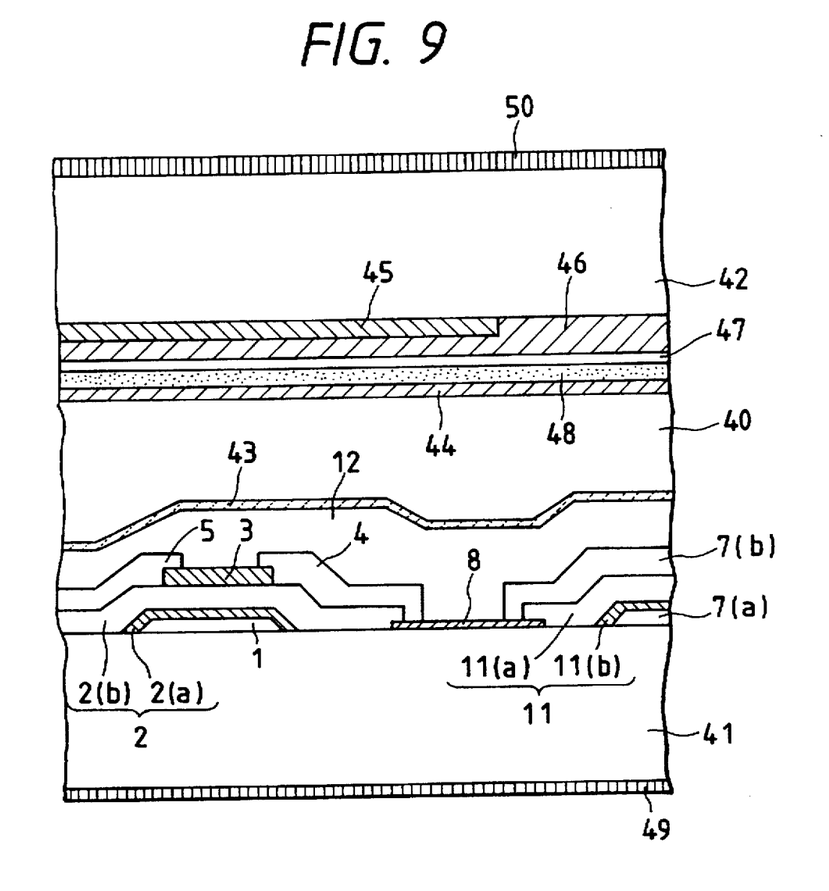
FIG. 9 is a sectional view of a typical TFT liquid crystal display in accordance with the present invention.

The construction of the liquid crystal display will be described hereinafter with reference to FIG. 9. The orientation of a liquid crystal layer 40 is controlled by a lower orientation film 43 formed over the inner surface of a lower transparent glass substrate 41 and an upper orientation film 44 formed over the inner surface of an upper transparent glass substrate 42. The lower orientation film 43 is formed over the SiN protective film 12 of the pixel formed on the lower transparent glass substrate 41. A black mask 45 for shading, a color filter 46, an organic protective film 47, a transparent counter common pixel electrode 48 and the upper orientation film 44 are superposed in that order on the inner surface of the upper transparent glass substrate 42. The transparent counter common pixel electrode 48 is opposite to the transparent pixel electrode 8 of each pixel formed on the lower transparent glass substrate 41. A common voltage Vcom is applied to the transparent counter common pixel electrode 48. The color filter 46 is formed of an acrylic resin or the like and is colored with dyes in different colors and is formed in stripes across each pixel between the two adjacent image signal lines 102 (FIG. 11).

The organic protective film 47 prevents the dissolution of the dyes of the color filter 46 into the liquid crystal layer 40. The organic protective film 47 is formed, for example, of a transparent resin, such as an acrylic resin or an epoxy resin.

The lower transparent glass substrate 41 provided with the pixels, and the upper transparent glass substrate 42 provided with the component films, which are fabricated individually, are combined one over the other, and a liquid crystal is sealed in a space between the lower transparent glass substrate 41 and the upper transparent glass substrate 42 with a sealing member of an epoxy resin or the like attached to the peripheries of the glass substrates 41 and 42 to complete the liquid crystal display. The transparent counter common pixel electrode 48 on the upper transparent glass substrate 42 is connected to a lead, not shown, formed on the lower transparent glass substrate 41. The lead is formed by the same processes as those for forming the gate electrode 1, the source electrode 4 and the drain electrode 5. The orientation films 43 and 44, the transparent pixel electrode 8 and the transparent counter common pixel electrode 48 are formed in an area surrounded by the sealing member. Polarizing plates 49 and 50 are attached to the respective outer surfaces of the lower transparent glass substrate 41 and the upper transparent glass substrate 42, respectively.

Figure 10:
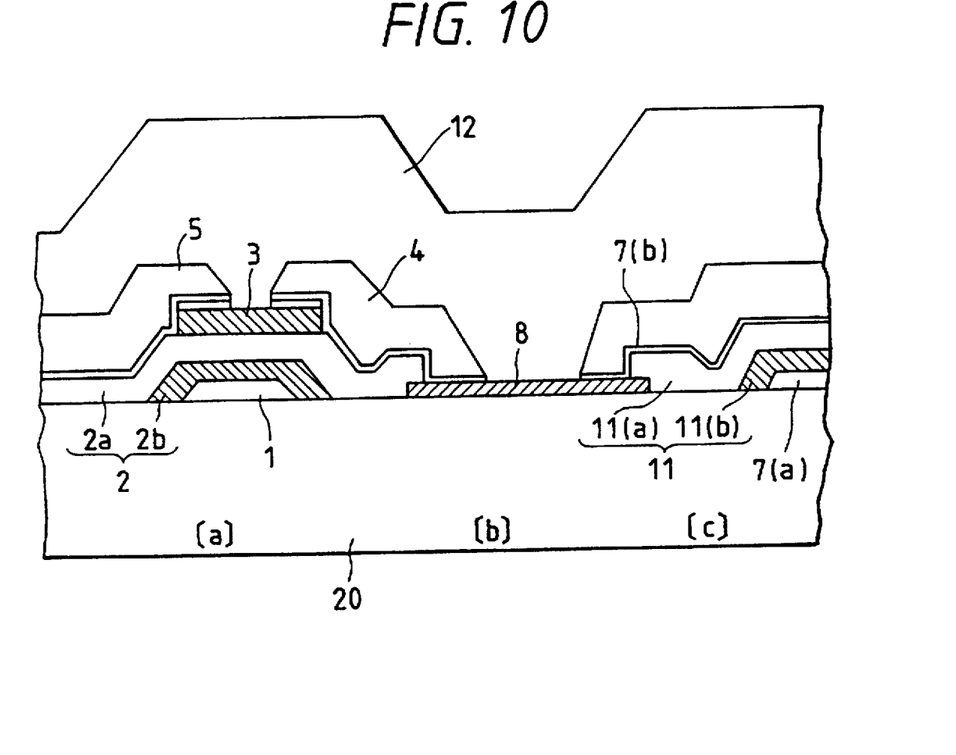
FIG. 10 is a sectional view of a typical one of the pixels of a TFT liquid crystal display in another embodiment according to the present invention.

FIG. 10 is a fragmentary sectional view of a pixel of a typical liquid crystal display in another preferred embodiment according to the present invention provided with a drain electrode 5, a source electrode 4 and an image signal line, not shown, formed by the taper etching techniques in accordance with the present invention. After forming the first conductive film A, i.e., the barrier layer, and the underlying layers by the same processes as those explained in connection with the first embodiment, an aluminum film of about 400 nm in thickness is formed by sputtering under conditions meeting the inequality: Tr>T>Tsd, the aluminum film is patterned by a known photolithographic process, and then the workpiece is immersed in an etchant of a composition specified in the triangular diagram shown in FIG. 8 to form a source electrode 4, a drain electrode 5 and an image signal line of upward tapered cross section having side surfaces inclined at an inclination of 45° or below. Then, a SiN protective film 12 is formed. The source electrode 4, the drain electrode 5 and the image signal line of upward tapered cross section improves the flatness of the SiN protective film 12 and hence the flatness of the lower orientation film, so that the lower orientation film can be uniformly rubbed and the liquid crystal is oriented uniformly to improve the characteristics of the liquid crystal display.

The gate electrode 1 may be formed of a material other than aluminum, prepared by adding one or more metals to aluminum as a matrix. The additive metals suppress the formation of aluminum hillocks and whiskers. The material of the gate electrode 1, desirably, has a low resistivity and must be capable of forming an insulating film in a self-aligned mode. Therefore, the additive metals must meet such requirements. The resistance of the gate electrode 1 can be reduced by properly determining the additive metal contents.

Since the insulating film is formed by an anodic oxidation process, it is important to select metals which can be easily anodized. Metals of the groups IVa and Va are suitable metals meeting those requirements. Representative suitable metals are aluminum alloys containing at least one of Ta and Ti. Such an aluminum alloy facilitates the control of the deposition temperature and can be deposited in an excellent film of columnar crystal grains.

Forming the gate electrode 1, the gate insulating film 2b, the scanning signal line, the source electrode 4, the drain electrode 5 and the image signal line extending from the drain electrode 5 of the same material enables etching films for forming those components with the same etchant, which facilitates the control of the manufacturing processes.

Figure 12:
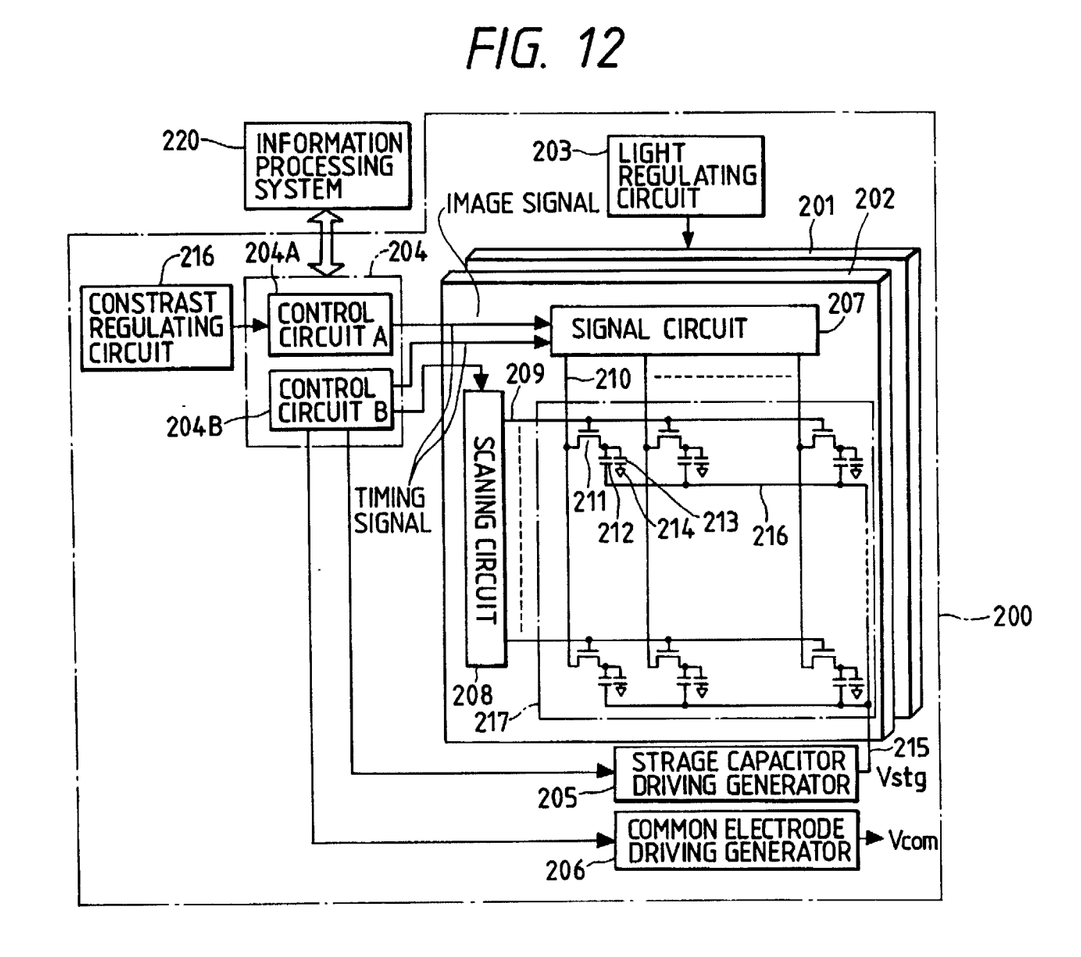
FIG. 12 is a diagrammatic view of a system including a TFT liquid crystal display in accordance with the present invention.

FIG. 12 shows a liquid crystal display system incorporating the liquid crystal display of the present invention. The liquid crystal display system comprises a display unit 200, and an information processing unit 220, such as a work station, a personal computer or a word processor. The display unit 200 comprises a liquid crystal display panel 202, a light source 201, a light regulating circuit 203, a control circuit 204 comprising an image data generator 204A and a timing signal generator 204B, a contrast regulating circuit 216, a storage capacitor driving voltage generator 205, and a common electrode driving voltage generator 206. A liquid crystal module comprises a liquid crystal panel 217, a signal circuit 207 that generates a signal voltage, and a scanning circuit 208 that generates a scanning voltage. The liquid crystal panel 217 comprises TFTs 211 using amorphous Si films or polycrystalline Si films, storage capacitors 212, liquid crystal capacitors 213, and signal lines 210 and scanning lines 209 for driving the TFTs 211. The voltage Vstg generated by the storage capacitor driving voltage generator 205 and the voltage Vcom generated by the common electrode driving voltage generator 206 are applied to a common storage capacitor driving line 215 and a common electrode terminal 214, respectively. The voltages Vstg and Vcom may be of the same level and of the same phase and are not subject to any particular restrictions.

The liquid crystal display of the present invention can be applied to the display units of desk-top computers and lap-top computers. Since the features of the liquid crystal display of the invention are particularly effective when the liquid crystal display is applied to a computer which needs to have a lightweight construction, the liquid crystal display of the present invention is effective in constructing lightweight compact computers including notebook type computers. The liquid crystal display of the present invention is applicable as a light shutter for a projection display. The projection display comprises a liquid crystal display and a projection unit includingan optical system, converts input video signals into image signals of a signal system suitable for the liquid crystal display, such as noninterlaced R-, G- and B- digital signals, by a video signal processing unit, and displays images represented by the digital signals on the liquid crystal display. The images displayed on the liquid crystal display are focused on a screen by the optical system. The light shutter is a principal factor dominating the size of the optical system. The use of the liquid crystal display having numerous pixels in a panel of a small area is effective in miniaturizing the light shutter. The liquid crystal display of the present invention is applicable to miniature color monitors and large wall type TV sets.

According to the present invention, the gate electrodes, the insulating films covering the gate electrodes and the scanning signal lines are formed in upward tapered sectional shapes having side surfaces inclined at an inclination of 45° or below by etching metal films of a columnar crystal structure, whereby the flatness of the protective film and the picture quality can be improved. The present invention improves the yield of the drain electrodes, the source electrodes and wiring lines including the image signal lines. The upward tapered sectional shape of the gate electrodes suppresses electrostatic focusing when forming the gate insulating films, which makes it possible to form stable insulating films and improves the yield of the manufacturing process. Aluminum and aluminum alloys containing at least one of the transition elements of the groups IVa and Va are easily deposited in films of columnar crystal grains facilitating the formation of lines having an upward tapered sectional shape. The inclination of the side surfaces of the lines can be adjusted by properly determining the nitric acid concentration and the acetic acid concentration of the etchant.

What is claimed is:

1. A method of fabricating a liquid crystal display having a transparent glass substrate; scanning signal lines formed on the transparent glass substrate; terminal electrodes respectively extending from the scanning signal lines; image signal lines extending perpendicularly to and isolated from the scanning signal lines; thin-film transistors, each having a gate electrode extending from a scanning signal line, a semiconductor layer formed on an insulating film covering the gate electrode, a source electrode, and a drain electrode paired with the source electrode and connected to an image signal line; and pixel electrodes connected respectively to the source electrodes formed on the insulating layer; said method comprising the steps of:

forming the scanning signal lines and the gate electrodes of the thin-film transistors, extending from the scanning signal lines in upward tapered sectional shapes having side surfaces inclined at an inclination of 45° or below, by etching a metal film of columnar crystal grains with a mixed etchant which consists of nitric acid, phosphoric acid and acetic acid and which contains 10 to 30% by volume of nitric acid.

2. A method of fabricating a liquid crystal display according to claim 1, wherein said mixed etchant contains not less than 50% by volume of acetic acid.

3. A method of fabricating a liquid crystal display according to claim 1, wherein each of the gate electrodes formed by etching the metal film of columnar crystal grains is coated with an insulating film of a self-aligned oxide film formed by anodic oxidation.

\* \* \* \* \*